UNITED STATES PATENT OFFICE.

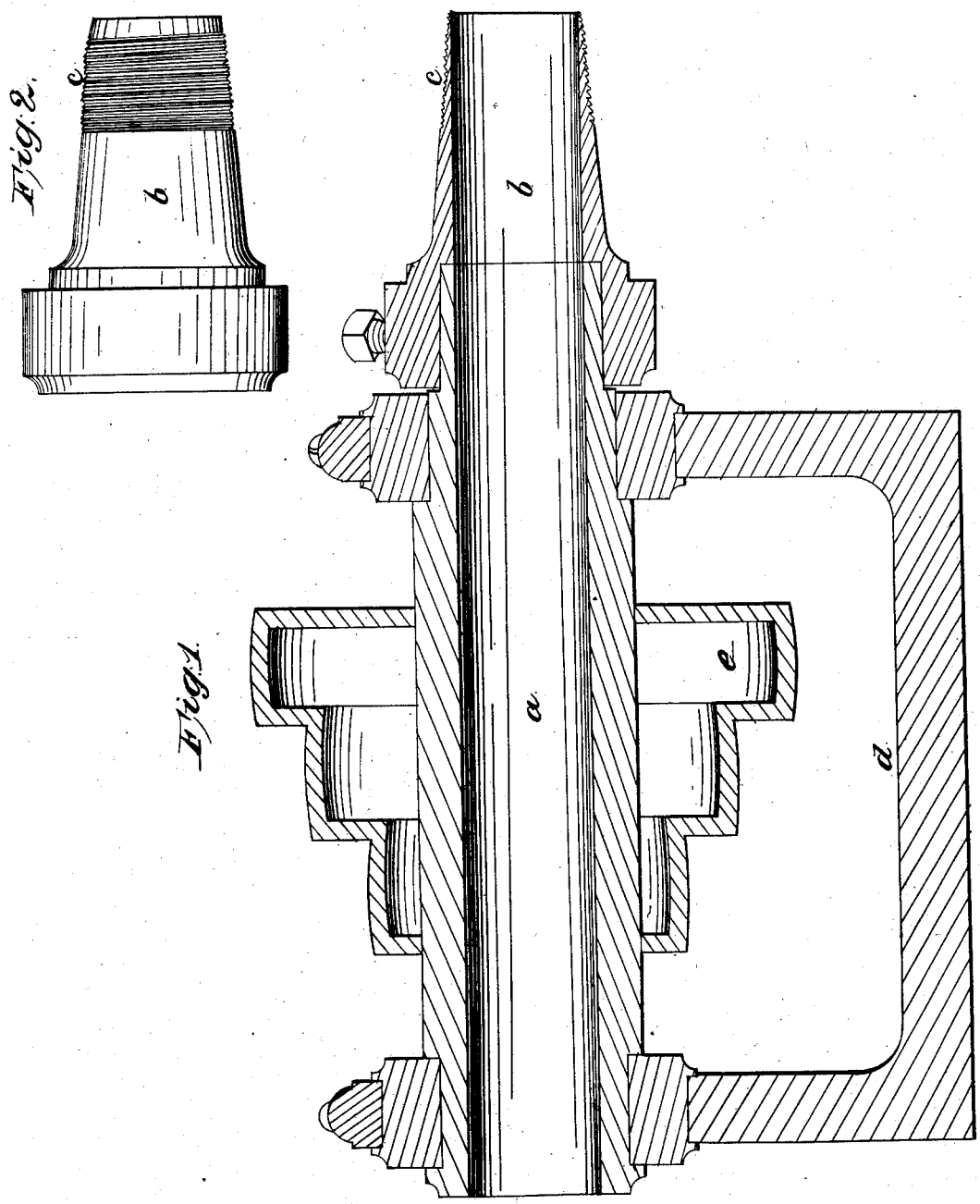

MATHAUS KAEFER, OF NEW YORK, N. Y.

CHUCK FOR CUTTING DISKS OF PAPER, &c.

Specification of Letters Patent No. 27,810, dated April 10, 1860.

*To all whom it may concern:*

Be it known that I, MATHAUS KAEFER, of the city, county, and State of New York, have invented a new and Improved Chuck for Cutting Paper, &c.; and I do hereby declare that the following is a full and exact description thereof, reference being had to the accompanying drawings and to the letters of reference marked thereon.

The nature of this invention is that of a hollow revolving cutter for cutting disks of paper (for boxes, &c.) with an improvement added by which the paper outside of the cutter is drawn inwardly, or expanded by the action of a screw upon the same, as below explained.

Figure 1, is a view of the standards, mandrel, pulleys, &c., carrying the cutter, (in section.) Fig. 2, is an outside view of the cutter.

A hollow mandrel ($a$,) open throughout its entire length, is fitted by suitable bearings to standards at each end of the head ($d$,) it being in form substantially that of a common lathe; motion is communicated to the mandrel by the pulleys ($e$). Further description of this will be unnecessary.

Upon the end of the mandrel is fitted a hollow steel cutter ($b$). Its inside is reamed carefully to the size which it is intended to cut, its outside is tapered, from an acute cutting edge at the outer end, enlarging toward the base, so as to give the requisite stiffness, or strength. On the outside of this cutter (or chuck) is formed a screw ($c$). Its thread commences a little distance back of the end of the cutter and extends about half of its length, and is of such fineness or coarseness as will accomplish the desired result as below.

In using the cutter, means are provided for feeding the paper (which rests upon a platform) by a screw or other convenient device, which it is not essential here more fully to allude to. A dozen, or more, sheets of pasteboard are placed upon (or against) the platform, so prepared and brought into contact with the cutter; when, in its passage into the mass, the first thickness that has been cut through reaches the screw threads upon the cutter, it will be seen that the paper (or that part immediately in contact with the chuck) is immediately drawn inward, or expanded from contact with those behind, assuming a bent or convex form on its outside, and this is followed by the next successively until the cutter has passed through all.

Hitherto disks, such as it is here contemplated to cut, have been stamped from the paper by a punch, a single thickness only being used and it is impracticable to do more for the reason that the taper upon the outside (which is essential to the strength of the cutter) cannot be forced to any considerable depth and would besides enlarge the hole to the damage of the surrounding paper, and this would also be true of the chuck herein described (were it not for the action of the screw ($c$,) as above) the hole would be enlarged, in its passage, to the greater size of the chuck; but by causing each separate thickness of paper, as cut through, to assume a rounded or conical shape (its outer edges being held to the feeding platform) the difficulty before alluded to is entirely obviated and the holes, so formed, are not perceptibly enlarged. Disks of this sort are thus cut with great facility and rapidity. It is also adapted for cutting other flexible material. The blanks thus cut are passed through the mandrel as will be well understood.

Having thus described my invention what I claim therein as new and desire to secure by Letters Patent is:

The hollow cutter ($b$,) arranged with screw threads around its outer surface, all substantially as herein set forth.

MATHAUS KAEFER.

Witnesses:
 N. BARBOUR,
 FRANCIS LEONARD.